United States Patent [19]
Holtslander et al.

[11] 3,995,017
[45] Nov. 30, 1976

[54] CATALYST FOR HYDROGEN-AMINE D EXCHANGE

[75] Inventors: William John Holtslander; Ronald Elvidge Johnson, both of Deep River, Canada

[73] Assignee: Atomic Energy of Canada Limited, Ottawa, Canada

[22] Filed: June 26, 1974

[21] Appl. No.: 483,292

[30] Foreign Application Priority Data
July 31, 1973  Canada .................................. 177785

[52] U.S. Cl. ............................. 423/648; 252/431 N; 260/563 R; 423/580
[51] Int. Cl.² ...................... B01D 59/32; B01J 31/12
[58] Field of Search ................ 252/431 N; 423/248, 423/648, 580; 260/563 R

[56] References Cited
UNITED STATES PATENTS

| | | | |
|---|---|---|---|
| 2,685,604 | 8/1954 | Humphreys | 260/563 R |
| 3,133,793 | 5/1964 | LeFrancois et al. | 423/648 |
| 3,457,041 | 7/1969 | Klein et al. | 423/648 |
| 3,716,621 | 2/1973 | Rae | 423/648 X |
| 3,716,623 | 2/1973 | Bancroft | 423/648 X |

FOREIGN PATENTS OR APPLICATIONS

| | | |
|---|---|---|
| 901,266 | 5/1972 | Canada |
| 1,341,475 | 12/1973 | United Kingdom |

OTHER PUBLICATIONS

Makhua, R. C. et al., "Potassium Methylamide; Preparation & Infrared Spectrum", Can. J. Chem., 49 (5) Mar. 1, 1971, pp. 807-809.

*Primary Examiner*—Helen M. McCarthy
*Attorney, Agent, or Firm*—Alan A. Thomson

[57] ABSTRACT

A process for deuterium isotopic enrichment (suitable for use in heavy water production) by amine-hydrogen exchange in which the exchange catalyst comprises a mixture of alkyl amides of two metals selected from the group consisting of the alkali metals. Catalyst mixtures comprising at least one of the alkali amides of lithium and potassium are preferred. At least one of the following benefits are obtained:decreased hydride formation, decreased thermal decomposition of alkyl amide, increased catalyst solubility in the amine phase, and increased exchange efficiency.

11 Claims, No Drawings

CATALYST FOR HYDROGEN-AMINE D EXCHANGE

This invention is concerned with catalyst for deuterium (D) exchange between hydrogen and an amine leading to deuterium enrichment (for instance for the production of heavy water).

One suitable source of deuterium is water, the water for example being converted to steam and the steam being contacted with a stream of hydrogen at elevated temperatures to transfer deuterium thereto. Ammonia synthesis gas (which is largely hydrogen) is also a suitable source of deuterium especially for smaller plants. The hydrogen stream from the chosen source (carrying the input D) may then be contacted with an organic amine phase by an exchange process to ultimately yield a stream of hydrogen or amine which is enriched in deuterium. Suitable exchange processes may be monothermal or bithermal. In a bithermal process for example, the hydrogen stream may be contacted in e.g. two stages and at two different temperatures within the range from the melting point of the amine up to about 100° C. Where the hydrogen stream is synthesis gas it may for example, be contacted with the liquid amine in a cold stripping tower and then fed through hot and cold exchange towers (e.g. see Report AECL-3684 A. R. Bancroft and H. K. Rae, August, 1970).

Following the amine-hydrogen exchange, a D-enriched stream can be withdrawn either as hydrogen or as amine and this D-rich stream further exchanged or reacted and concentrated by known techniques to give a heavy water product.

It is known to use an aliphatic amine as exchange liquid containing a dissolved alkali metal alkylamide as exchange catalyst. Certain aliphatic amines and alkali metal alkylamides have been listed in Canadian Pat. No. 719,200, Oct. 5, 1965 Klein et al for use in this process, a preferred combination being potassium methylamide in methylamine. The other alkali metals and amine combinations all have drawbacks, of ranging severity, that make them impractical for process consideration. For example we have shown that lithium methylamide in methylamine has an exchange rate 100 times slower than potassium methylamide; and sodium methylamide in methylamine has less than half the exchange rate of potassium methylamide. We found that cesium methylamide has an exchange rate comparable to potassium methylamide in methylamine at the same catalyst concentration; however the solubility limit for cesium methylamide is only 15% of that of potassium methylamide and cesium is substantially more expensive than potassium. Our experiments have shown that amines other than methylamine have serious disadvantages: generally the solubilities of the catalyst are lower. With dimethylamine the potassium dimethylamide is difficult to prepare and its solubility is low. The same disadvantages apply to the isopropylamine-potassium system (difficult to prepare catalyst, low catalyst solubility and slow exchange rates). It is clear that while a variety of alkali metal alkylamide-amine systems undergo isotopic exchange the potassium methylamide-methylamine system is currently considered most practical for economic process application.

For most economical operation, the process should operate at an elevated pressure: for example up to about 3500 psi and preferably from about 1000 to about 3500 psi. Under these conditions the potassium methylamide-methylamine system suffers a serious disadvantage. The potassium methylamide catalyst reacts with the hydrogen to form potassium hydride which is essentially insoluble in methylamine. The reaction is

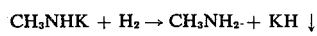

Because the potassium hydride is precipitated from the solution the equilibrium is shifted to the right reducing the concentration of potassium methylamide catalyst in solution which, because this concentration has such a strong effect on the exchange rate, lowers the exchange rate achievable without the continuous addition of fresh potassium methylamide catalyst. The precipitation of the potassium hydride causes a disposal problem because the hydride can foul the surfaces of the equipment and pumps and would have to be separated from the solution. The effect of this reaction is illustrated by the following results of our experiments. The maximum concentration of potassium methylamide in methylamine at 1. zero partial pressure of hydrogen and 25° C = 0.57 mmoles/g
2. 1000 psi partial pressure of hydrogen and 25° C = 0.067 mmoles/g This reduction in catalyst concentration reduces the exchange rate (in conventional mass transfer apparatus such as sieve tray columns or bubble bed columns) by a factor of about two.

We find this hydride precipitation also occurs with sodium methylamide in methylamine, and in the potassium dimethylamide, dimethylamine system. However, we have found that lithium or cesium methylamide in methylamine do not react significantly with hydrogen.

A second disadvantage of the potassium methylamide methylamine system is that potassium methylamide decomposes thermally at temperatures above 25° C. Work done by Raylo Chemicals Limited has shown that the decomposition products are hydrogen, potassium sym-dimethylformamidine and ammonia.

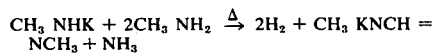

The ammonia formed reacts with the potassium methylamide to form potassium amide.

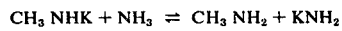

We have observed that potassium amide has a low solubility in methylamine and precipitation occurs as decomposition proceeds. Thus thermal instability reduces exchange efficiency of the potassium methylamide-methylamine system by reduction of the catalyst concentration.

It is the intent of the present invention to reduce or eliminate these difficulties of the potassium methylamide-methylamine system i.e. substantially completely prevent the reaction of the catalyst with hydrogen to form hydride, and to substantially reduce the rate of thermal decomposition of catalyst. Also, in some cases, the catalyst solubility and D exchange rate can be increased.

These improvements are accomplished by the addition of further different alkali metal alkyl amide to the solution preferably so that it is at least about equimolar with the original alkali metal alkyl amide catalyst.

Particular combinations which showed reduced or negligible hydride formation under hydrogen pressure are: Li alkylamide and K alkylamide; Li + Na; and Na + Cs. Some of these combinations also showed a synergistic increase in exchange rate (see Examples). K + Cs methyl amide mixture showed an increased exchange rate but with some hydride precipitation The relative proportions of the alkylamides may be varied widely but it is usually desirable to have at least about 40 mole % of the mixture composed of an alkylamide which itself does not lead to hydride precipitation (e.g. of Li or Cs). While relative proportions of the second alkali metal alkyl amide to the first alkali metal alkyl amide catalyst are not critical, it is preferred that the second alkali metal alkyl amide is present at a concentration such that it is at least about equimolar with the first alkali metal alkyl amide catalyst. One preferred catalyst system is the combination of lithium methyl amide with potassium methyl amide in a molar ratio of at least about 1:1 up to about 5:1 and most preferably from about 1:1 to about 2:1.

The upper concentration limit for the total alkylamides is saturation of the amine solution but there is no sharp lower limit since small amounts will have some catalytic effect. Sufficient catalyst should be present in solution to give a useful D exchange rate.

In addition to methylamine (and the methylamides) it is also within the scope of the invention to utilize other alkylamines both primary and secondary, and alkyl diamines (see Klein et al. above and Bancroft et al., Can. Pat. No. 901,266, May 30, 1972). The alkyl groups involved may have one to five carbon atoms in straight or branched chains. Such other amines include dimethylamine, aminoethane, 2-aminopropane, 1,2-diaminoethane and 1,2-diaminopropane.

The properties of these catalyst combinations are illustrated by the following examples.

EXAMPLE 1

A solution containing 0.5 millimoles of potassium methylamide per gram of methylamine solution when contacted at room temperature with hydrogen at 1000 psi precipitated potassium hydride so that the maximum potassium methylamide concentration in solution became 0.067 millimoles/g. The relative exchange rate constants for exchange of D between hydrogen and methylamine at these two concentrations were measured, and a reduction in exchange rate by approximately a factor of 2 observed. A second solution containing 0.49 millimoles potassium methylamide per gram of solution plus 0.52 millimole lithium methylamide per gram of solution when contacted similarly with hydrogen at 1000 psi did not precipitate potassium hydride. After filtering the latter solution at 1000 psi hydrogen partial pressure, analysis of the filtrate showed it to contain 0.53 millimoles lithium methylamide per gram of solution and 0.46 millimoles of potassium methylamide per gram of solution; i.e. the same concentrations as the original solution, within experimental error. The relative exchange rate constants for the above potassium-lithium methylamide solution in methylamine and the potassium methylamide in methylamine at maximum process concentration of 0.067 mmoles/g were measured and their ratio was 2.3 i.e. the addition of lithium allowed an increase in exchange rate by a factor of 2.3.

The lithium methylamide addition was also effective at different concentrations greater than equimolar with potassium methylamide. For example a solution containing initially 0.98 mmoles lithium methylamide/g and 0.46 millimoles potassium methylamide/g after contact with $H_2$ at 1000 psi and filtration, the filtrate contained 0.98 and 0.50 mmoles/g of lithium- and potassium methylamide respectively. Concentrations of lithium methylamide less than equivalent with potassium methylamide are operative though not preferred.

Reduction in the thermal decomposition rate of mixtures in the presence of lithium methylamide is shown by the following measurements. The half life for the thermal decomposition of a potassium methylamide solution in methylamine at 70° C was 0.8 days; while for a solution mixture containing an equimolar amount of lithium methylamide the half life was 5 days at 70° C (approximately six times longer).

In addition to preventing the reaction of potassium methylamide with hydrogen and reducing the thermal decomposition rate, there are two additional benefits from using this new composite catalyst: the solubility of potassium methylamide is increased (in methylamine) and the D exchange efficiency is improved over potassium methylamide at the same concentration. The maximum solubility of potassium methylamide in methylamine at 25° C is 0.57 mmoles/g; with equimolar lithium methylamide present the potassium methylamide solubility is greater than 2.5 mmoles/g.

The increase in D exchange efficiency by the addition of lithium methylamide to a potassium methylamide solution at the normal saturation for K methyl amide is small (+15%): however a more substantial gain is achieved because of the increased solubility brought about by the addition. For example a solution containing 0.77 mmoles of potassium and 0.70 mmoles lithium methylamide per gram of solution at −40° C showed an increase in exchange efficiency of 43% compared to a saturated potassium methylamide solution 0.5 mmoles/g. at the same conditions.

EXAMPLE 2

A survey of other combinations of alkylamides of alkali metals has been carried out and the exchange rate $k$ and any hydride precipitation observed. The results are summarized in Table I for the single metal methylamides as well as the binary mixtures. The exchange activity was measured in a laboratory exchange apparatus at −70° C on solutions in monomethylamine of the stated metal methylamides, e.g. for the mixed Na + K system, the concentrations at about 20° C were 0.48 mmoles/g of sodium methylamide and 0.49 mmoles/g of potassium methylamide. The reactivity with hydrogen was determined in a separate experiment where hydride precipitation was measured when 600 psi hydrogen was applied to the solution.

Table I.

| | Properties of Mixed Alkali Metal Methylamides in Aminomethane | | | |
|---|---|---|---|---|
| | Li | Na | K | Cs |
| | $k = 1$ | $k = 21$ | $k = 110$ | $k = 23$ |
| | [Li] = 0.5 | [Li] 32 0.5 | [K] = 0.5 | Slight hydride precipitation (?) |

Table I.-continued

| | Properties of Mixed Alkali Metal Methylamides in Aminomethane | | | |
|---|---|---|---|---|
| | Li | Na | K | Cs |
| Li | No Hydride precipitation | [Na] = 0.5 No hydride precipitation k = 37 | [Li] = 0.5 No hydride precipitation k = 51 | k = 174 |
| Na | — | Hydride ppts | [Na] = 0.7 [K] = 0.49 Hydride ppts k = 95 | [Na] = 0.03 [Cs] = 0.03 Slight precipitation of hydride k = 116 |
| K | — | — | Hydride ppts | [K] = 0.5 [Cs] = 0.12 Hydride ppts k = 98 |
| Cs | — | — | — | [K] = 0.12 [Cs] = 0.12 No hydride precipitation |

Notes:
All exchange rates, k, at −70° C, units min$^{-1}$
All hydride precipitation tests at 600 psi hydrogen
All concentrations [ ] in mmoles/g at ~20+²C No hydride precipitation occurred in the presence of lithium with the possible exception of Li + Cs solutions. The slight precipitation with Li + Cs must be suspect observation since neither Li nor Cs precipitate hydride alone. The absence of hydride precipitation with Cs methylamide was confirmed by a further high pressure filtration at 1000 psi hydrogen. The Na — Cs solution showed a high exchange rate at low catalyst concentration with only slight hydride precipitation (it was observed however that the solubility limit of this mixture was low Na = Cs < 0.1 mmoles/g). At a molar ratio of 1:1 for the K + Cs mixture there was some hydride precipitation but a synergistic increase in exchange rate was observed.

We claim:

1. A process of enriching deuterium employing the hydrogen-methylamine exchange reaction catalyzed by alkali metal methylamide in the amine phase, at elevated hydrogen pressures, comprising providing a composite catalyst consisting essentially of a mixture of methylamides of two alkali metals dissolved in methylamine, the two alkali metals being chosen from the pairs: lithium plus sodium; lithium plus potassium; and sodium plus cesium, the methylamides of the composite catalyst being in molar proportions which show insignificant hydride precipitation in the amine at hydrogen pressures sufficient to precipitate sodium alone, or potassium alone as hydrides.

2. The process of claim 1 wherein the catalyst is a mixture of lithium plus one of sodium and potassium methylamides.

3. The process of claim 1 wherein the catalyst is a mixture of lithium and potassium methylamides.

4. The process of claim 1 wherein the catalyst is a mixture of lithium- and potassium methyl amides, the molar ratio of Li- to K methyl amide being at least about 1:1.

5. The process of claim 1 wherein the mixture is selected from methyl amides of Li + Na; and Na + Cs.

6. The process of claim 1 wherein the deuterium exchange is carried out under a hydrogen pressure of up to about 3500 psi.

7. The process of claim 1 wherein the temperature of the exchange process ranges from above the m.p. of the amine up to about 100° C.

8. A composite catalyst for the exchange of deuterium between hydrogen and methylamine said catalyst consisting essentially of a mixture of methylamides of two alkali metals dissolved in methylamine; said alkali metals being selected from the pairs: Li plus Na; Li plus K; and Na plus Cs; the methylamides of the composite catalyst being in molar proportions which show insignificant hydride precipitation in the methylamine at hydrogen pressures sufficient to precipitate sodium alone, or potassium alone as hydrides.

9. The catalyst of claim 8 wherein the mixture is lithium plus one of sodium and potassium methylamides.

10. The catalyst of claim 8 wherein the mixture is lithium plus potassium methylamides.

11. The catalyst of claim 10 wherein the molar ratio of lithium to potassium methylamides is at least about 1:1.

* * * * *